July 29, 1958

C. H. GAMBELL 2,845,157

MAGNETIC FLUID CLUTCH WITH PERMANENT MAGNETS

Filed Feb. 1, 1955

CARLOS H. GAMBELL
INVENTOR

James A. Givnan
ATTORNEY

United States Patent Office 2,845,157
Patented July 29, 1958

2,845,157

MAGNETIC FLUID CLUTCH WITH PERMANENT MAGNETS

Carlos Harvey Gambell, Mulino, Oreg.

Application February 1, 1955, Serial No. 485,390

1 Claim. (Cl. 192—21.5)

This invention relates to transmission devices and more particularly to a variable speed transmission of the magnetic type.

One of the principal objects of the invention is to provide a novel and improved combined torque changer and variable speed transmission of the magnetic type which is of simple, efficient, and durable construction, positive in operation, adapted to provide high starting torque for starting a load from a condition of rest through selective speeds up to a final condition wherein the driven shaft of the transmission rotates at the same speed as the driving shaft.

The foregoing and other objects will appear as my invention is more fully hereinafter described in the following specification, illustrated in the accompanying drawings and finally pointed out in the appended claim.

Figure 1:
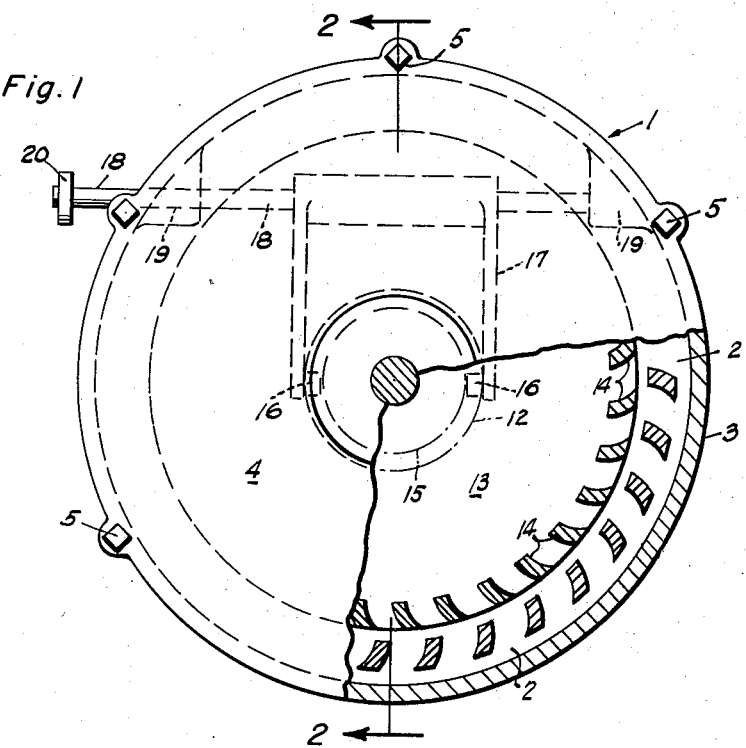
Figure 1 is an end view of the invention with fragments broken away for convenience of illustration.
Figure 2:
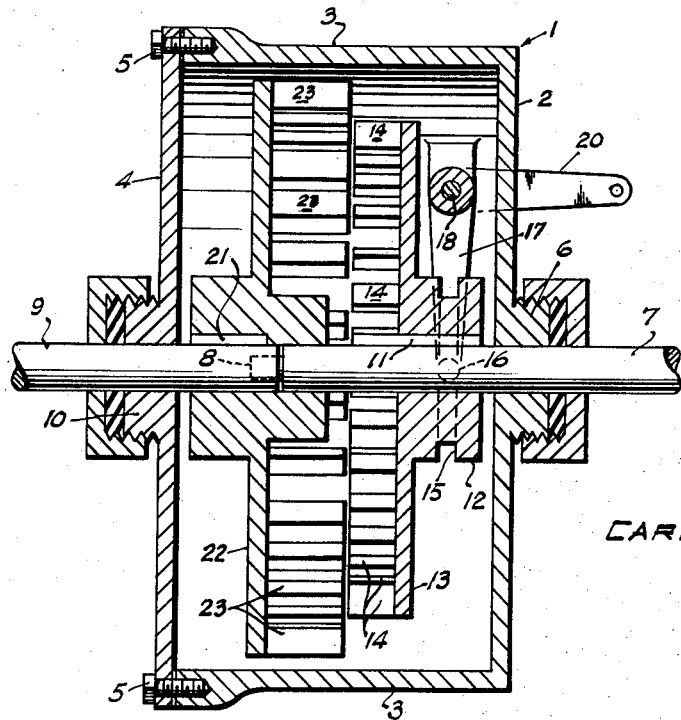
Figure 2 is a sectional view taken along line 2—2 of Figure 1.

Referring now more particularly to the drawing:

In Figures 1 and 2 the reference numeral 1 indicates generally a transmission housing of cylindrical formation having a solid wall 2, side wall 3, and a removable wall 4 removably secured to the housing 1, by means of bolts 5. The wall 2 is centrally formed into or provided with a bearing 6 within which is journaled a drive shaft 7 connected at one of its ends in any approved manner to an engine or motor (not shown).

The inner end of the drive shaft 7 is reduced in diameter as at 8 and journaled within the inner end of a driven shaft 9 journaled in a bearing 10 formed in the removable wall 4.

Splined to the drive shaft 7, as indicated at 11, is the hub 12 of a clutch member in the form of a disc 13 provided with a plurality of horizontally extending circumferentially spaced permanent magnets 14 each having an inner edge and an outer edge and said magnets being so arranged that the south pole of each is on the inside and the north pole on the outside. The hub 12 is provided with an inwardly directed annular groove 15 in which are positioned opposing ends 16 of a shifting yoke 17 affixed to a shaft 18 journaled as at 19 in the wall 3 of the transmission housing and provided at its outer end with an actuating arm 20 which leads to suitable control lever (not shown). Fixedly secured, as at 21, to the driven shaft 9 is a companion clutch member comprising a disc 22 of greater diameter than that of the disc 13 and provided with horizontally extending circumferentially spaced permanent magnets 23 each having an inner edge and an outer edge concentric with those on the disc of the clutch member 13 and so arranged that the south pole of each is also on the inside and the north pole on the outside. Thus both series of magnets will offer maximum attraction for each other. Any current generated in the fluid by relative rotation of the magnets 14 and 23 will be in the form of eddy currents and will produce heat as it does in the core of any electromagnet or permanent magnet thus involved. If this heat becomes objectionable, any suitable cooling means (not shown) may be provided.

The transmission housing is filled to a suitable level with an hydraulic fluid and comminuted iron, and thus it will be seen that as the permanent magnets of the clutch member 13 are moved, by the actuating arm and shifting yoke 17, toward and away from those of the companion clutch member 22 their greater or lesser attractive power will cause the fluid mixed with iron filings to offer greater or lesser resistance between the magnets of both clutch members from a condition of rest to the final condition wherein the driven shaft 9 rotates at the same speed as the driving shaft 7.

While I have shown a particular form of embodiment of my invention I am aware that many minor changes therein will readily suggest themselves to others skilled in the art without departing from the spirit and scope of the invention.

Having thus described my invention, what I claim as new and desire to protect by Letters Patent is:

A power transmission mechanism comprising a housing, a driven shaft extending into one end of said housing, a drive shaft extending into the other end of said housing and piloted in said driven shaft in axial alignment therewith, a first clutch member comprising a disc slidably mounted upon and rotatable with said drive shaft, a second clutch member comprising a disc of greater diameter than said disc of the first clutch member fixedly secured to said driven shaft, each of said discs being provided with a single row of horizontally extending permanent magnets having inner and outer edges and affixed in circumferential spaced relation on its peripheral portion, the outer edges of the magnets on the first clutch member being of a polarity opposite to that of the inner edges of the magnets on said second clutch member, a mixture of oil and comminuted iron within said housing, mechanical means for moving said first clutch member toward or away from said second clutch member to thereby vary the mutual attraction of the magnets from maximum to minimum and whereby increase in the viscosity of said mixture from minimum to maximum will increase the coupling effect of said magnets.

References Cited in the file of this patent

UNITED STATES PATENTS

| 2,300,778 | Cornwell | Nov. 3, 1942 |
| 2,575,360 | Rabinow | Nov. 20, 1951 |
| 2,577,057 | White | Dec. 4, 1951 |

FOREIGN PATENTS

| 526,396 | Belgium | Feb. 27, 1954 |